Dec. 22, 1953  J. W. WATSON  2,663,563
LEAF SPRING END SPACER AND CUSHIONING DEVICE
Filed April 25, 1947
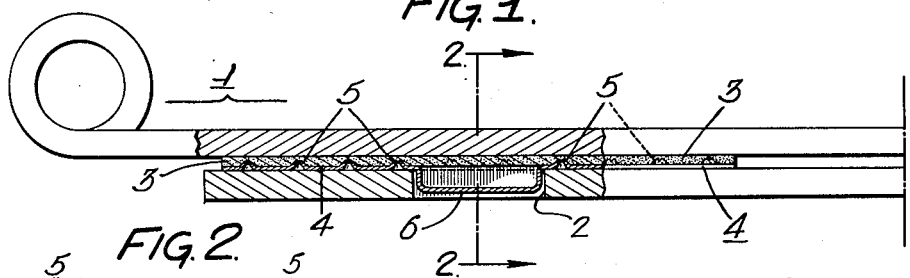
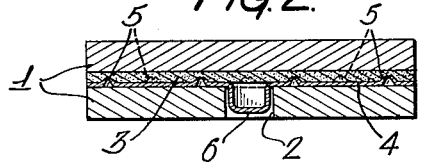
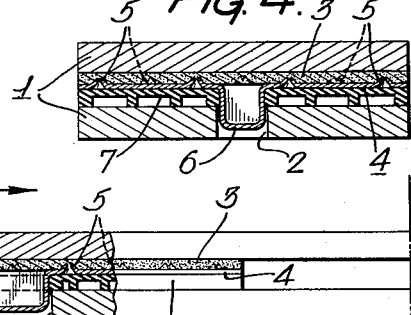
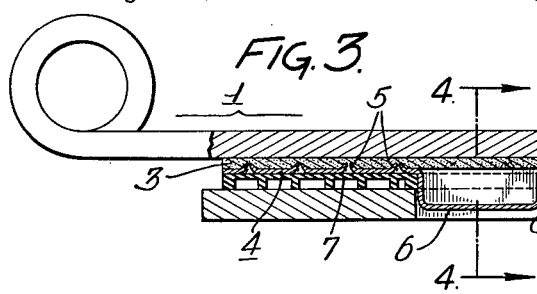
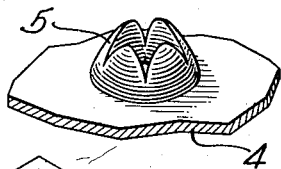
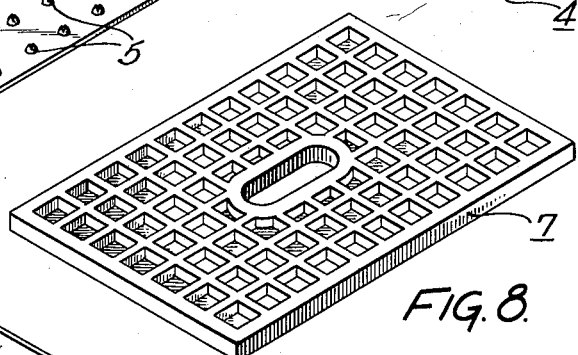
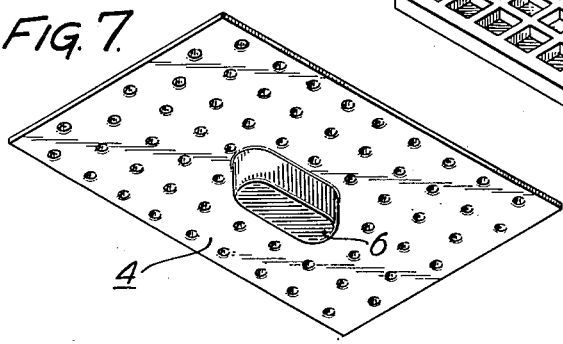
Inventor:
John Warren Watson
by his Attorneys
Howson & Howson Patented Dec. 22, 1953

2,663,563

UNITED STATES PATENT OFFICE 2,663,563

LEAF SPRING END SPACER AND CUSHIONING DEVICE

John W. Watson, Wayne, Pa.

Application April 25, 1947, Serial No. 743,996

7 Claims. (Cl. 267—49)

This invention relates to a friction bearing structure for positionment between two relatively movable bodies and in particular for positionment between the end portions of two adjacent leaves of a leaf spring.

A particular object of my invention is to provide adequate means for fixedly anchoring the friction bearing structure against shear movements with relation to one of said bodies.

A further particular object of my invention is to provide resilient cushioning means between the friction bearing structure and one of said bodies and means also for anchoring said bearing structure and said cushioning means against all tendency toward shear movements with relation to said one body.

A further object of my invention is to provide means for preventing objectionable turning movements of the friction bearing structure with relation to one of said bodies when the device is assembled between them.

In the attached drawings:

Fig. 1 is a fragmentary side elevation of a leaf spring, partly in section.

Fig. 2 is a section on line 2—2 Fig. 1.

Fig. 3 is the same as Fig. 1 but with the addition of a cushioning device.

Fig. 4 is a section on line 4—4 Fig. 3.

Fig. 5 is a perspective view showing one side of my novel anchoring member whereon the anchoring means are seen to be widely distributed over its surface.

Fig. 6 is an enlarged fragmentary perspective view showing in detail the form of the anchoring means.

Fig. 7 is a perspective view showing the reverse side of this anchoring member and emphasizing an integral, projecting lug for anchoring the device in a hole of similar size and shape positioned adjacent an end of one of the leaves.

Fig. 8 is a perspective view showing a soft rubber cushioning member.

Referring to the numerals:

1, a spring leaf. 2, an elongated hole. 3, a leaf-end friction bearing structure. 4, an anchor plate. 5, small, perforated projections widely distributed over a surface of the anchor plate 4. 6, an anchor lug. 7, a resilient cushioning device.

When employing leaf-end friction bearing structures of relatively frail structure, such as, for example, impregnated paper or thin strips of impregnated fabric, it has long been found difficult to adequately anchor such bearing structures with relation to one of the leaves.

Most attempts at such anchoring have been confined to stapling or otherwise affixing a button or lug to the friction member, the lug being designed to fit into a hole provided adjacent an end of the leaf. This small area of holding grip or bond has, in most cases, proved to be quite inadequate as it constitutes such a relatively small proportion of the total area of the bearing structure which is under heavy load and operates against a desirably high coefficient of friction.

As will be seen from the drawings, instead of thus localizing the anchorage, I distribute the anchoring means widely over substantially the full area of the delicate friction bearing structure. Each little prong embedded into the friction structure is allotted but a fraction of a square inch thereof to push and pull back and forth between the spring leaves. This method is in contrast with attempting to push and pull, back and forth, an average of say eight square inches from some localized spot. This new method provides a perfect and permanent anchorage of the friction bearing structure. By means of an elongated design of lug and hole, anchorage against any turning movements is also provided.

With certain friction materials now developed, wherein the static and dynamic coefficients of friction are balanced, and wherein there is no stick at the start of movements, it develops that no wear takes place on the spring leaf or on the friction member. This no-wear result has been demonstrated after upwards of over fifty thousand miles of actual road work. It would seem that any such unexpected result is due to the fact that there is no stick at the start of movements. If two members stick to each other and are then forced to be broken loose, a minute tearing action apparently takes place and any such action occurring millions upon millions of times results in wear. Without the stick, and in its place a totally smooth action, there can be no tear and there is no wear.

It has been found, however, that after great mileage, as above, the liners or spacers at their tip ends do deteriorate and crumble away for a distance of about two inches. This deterioration of the friction material, however, has been shown to occur between only the first and second longest leaves of the leaf spring. I have diagnosed this deterioration as resulting from the peening actions between the axle and the tip ends of the spring in the case of cross springs such as have been employed on Ford cars or between the weighted body and the tip ends of the spring in the case of conventional side springs. The rubble of the road is constantly transmitting these destructive peening actions. To soften or cushion these blows is the purpose of my cushioning device. This cushioning, in addition to sparing the friction member also spares the car itself and the passengers from the effect of this harshness.

To provide the softest possible cushion I prefer a rubber of low durometer. Also to further the softness of the cushion I prefer a rubber member provided with a large number of holes distributed over its entire area. These holes give the rubber a place to go when squeezed or hit.

Having thus described the invention and pointed out a few of its uses by way of example, I claim:

1. In combination, two adjacent leaves of a leaf spring, a leaf-end friction bearing structure between said leaves and presenting to one of them a surface of sufficient yieldability to conform to irregularities thereof, and anchoring means providing adequate factors of engagement with said bearing structure and with the other of said leaves adjacent an end thereof for maintaining said bearing structure in predetermined limited position with relation to said leaves while in service, said entire anchoring means being mechanical and extrinsic to said bearing structure and comprising an anchoring device in meshed engagement with said other of said leaves adjacent an end thereof and in acting meshed engagement with said bearing structure and the sole support of said anchoring device against the force of gravity being provided by said other of said leaves, the nature of the structural engagement between said anchoring means and said other of said leaves or said bearing structure making possible with reasonable facility, the initial anchoring of said bearing structure with relation to said other of said leaves and/or, for replacement purposes and without removing the spring from its position, the removal of said bearing structure from between said leaves and, where necessary, the removal of said anchoring means from between said leaves.

2. In combination, two adjacent leaves of a leaf spring, a leaf-end friction bearing structure between said leaves and presenting to one of them a surface of sufficient yieldability to conform to irregularities thereof, and mechanical anchoring means providing adequate factors of engagement with said bearing structure and with the other of said leaves adjacent an end thereof for limiting longitudinal, lateral and turning movements of said bearing structure with relation to said leaves while in service, said anchoring means comprising an anchoring device extrinsic to said bearing structure and supported by supporting means also extrinsic to said bearing structure and which supporting means in turn is supported by said other of said leaves and which anchoring device is in predetermined limited position with relation to said other of said leaves adjacent an end thereof and in acting meshed engagement with said bearing structure, the nature of the structural engagement between said anchoring means and said other of said leaves or bearing structure making possible with reasonable facility, the initial anchoring of said bearing structure with relation to said other of said leaves and/or, for replacement purposes and without removing the spring from its position, the removal of said bearing structure from between said leaves and, where necessary, the removal of said anchoring means from between said leaves.

3. In combination, two adjacent leaves of a leaf spring, a leaf-end friction bearing structure between said leaves and presenting to one of them a surface of sufficient yieldability to conform to irregularities thereof, and anchoring means for limiting longitudinal, lateral and turning movements of said bearing structure with relation to said leaves while in service, said anchoring means comprising a plate-like anchor member of approximately the same over-all plan size as that of said bearing structure and in acting meshed engagement with the other of said leaves adjacent an end thereof and presenting a multiplicity of widely dispersed projections in acting meshed engagement with said bearing structure.

4. In combination, two adjacent leaves of a leaf spring, a leaf-end friction bearing structure between said leaves and presenting to one of them a surface of sufficient yieldability to conform to irregularities thereof and anchoring means for maintaining said bearing structure in predetermined limited position with relation to said leaves while in service, said anchoring means comprising a plate-like anchor member of approximately the same plan size as that of said bearing structure and in predetermined limited position with relation to said bearing structure and in acting meshed engagement with the other of said leaves adjacent an end thereof.

5. In combination, two adjacent leaves of a leaf spring, a leaf-end friction bearing structure between said leaves and soft rubber cushioning means between said bearing structure and one of said leaves, and anchoring means for limiting longitudinal, lateral and turning movements of said bearing structure with relation to said one leaf while in service, said anchoring means comprising an anchoring device in predetermined limited position with relation to said one leaf adjacent an end thereof and extending past said cushioning means and into meshed engagement with said bearing structure, said combination acting to permit and cushion relative vertical movements between said leaves and thereby isolate said bearing structure from destructive peening actions and acting also to closely restrict horizontal longitudinal movements of said bearing structure with relation to said one leaf and thereby satisfactorily isolate said cushioning means from shearwise stress during flexing of the spring.

6. In combination, two relatively reciprocating load-supporting bodies associated with the suspension mechanism of a vehicle, a friction bearing structure between said bodies and soft rubber cushioning means between said bearing structure and one of said bodies and anchoring means for maintaining said bearing structure in predetermined limited position with relation to said one body while in service, said anchoring means comprising an anchoring device supported solely by and in predetermined limited position with relation to said one body and extending past said cushioning means and into acting meshed engagement with said bearing structure, said bearing structure presenting to said other body a surface of sufficient yieldability to conform to irregularities thereof and exhibiting frictional properties whereof the static and dynamic coefficients of friction are sufficiently in balance to avoid setting up destructive spasmodic actions and/or objectionable noise-producing vibrations while in service, said combination acting to permit and cushion relative vertical movements between said bodies and thereby isolate said bearing structure from destructive peening actions and also, within expedient manufacturing tolerances of the relatively meshing parts, to closely restrict horizontal movements of said bearing structure with relation to said first mentioned body and thereby satisfactorily isolate said cushioning means from shear-wise stress during relative movements of the bodies.

7. In combination, two adjacent leaves of a leaf spring, a leaf-end friction bearing structure between said leaves and presenting to one of them a surface of sufficient yieldability to conform to irregularities thereof and exhibiting frictional properties whereof the static and dynamic co-efficients of friction are sufficiently in balance to avoid setting up destructive spasmodic actions and/or objectionable noise-producing vibrations, and anchoring means for limiting longitudinal, lateral and turning movements of said bearing structure with relation to said leaves while in service, said anchoring means comprising an anchoring device contacting under pressure a face of said bearing structure and an approximately equal area of the opposing face of said other leaf and locked with relation to said bearing structure and supported by and locked with relation to said last mentioned leaf adjacent an end thereof.

JOHN W. WATSON.

References Cited in the file of this patent

UNITED STATES PATENTS

| Number | Name | Date |
| --- | --- | --- |
| 1,336,752 | Muller | Apr. 13, 1920 |
| 2,028,299 | Swinton | Jan. 21, 1936 |
| 2,029,366 | Geyer | Feb. 24, 1936 |
| 2,280,201 | Thompson | Apr. 21, 1942 |
| 2,299,873 | Beckel et al. | Oct. 27, 1942 |
| 2,319,172 | Watson et al. | May 11, 1943 |
| 2,340,187 | Hersey et al. | Jan. 25, 1944 |
| 2,346,092 | Tollzien | Apr. 4, 1944 |
| 2,355,801 | Hildenbrand | Aug. 15, 1944 |

FOREIGN PATENTS

| Number | Country | Date |
| --- | --- | --- |
| 286,330 | Great Britain | Feb. 29, 1928 |